(12) United States Patent
Kaasalainen et al.

(10) Patent No.: US 11,895,573 B2
(45) Date of Patent: Feb. 6, 2024

(54) METHODS AND APPARATUSES FOR LIMITED UPLINK

(71) Applicant: Nokia Technologies Oy, Espoo (FI)

(72) Inventors: Janne Kaasalainen, Soderkulla (FI); Anna Sillanpaa, Jarvenpaa (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 448 days.

(21) Appl. No.: 17/282,208

(22) PCT Filed: Oct. 29, 2019

(86) PCT No.: PCT/IB2019/059270
§ 371 (c)(1),
(2) Date: Apr. 1, 2021

(87) PCT Pub. No.: WO2020/089791
PCT Pub. Date: May 7, 2020

(65) Prior Publication Data
US 2022/0007269 A1    Jan. 6, 2022

Related U.S. Application Data

(60) Provisional application No. 62/752,098, filed on Oct. 29, 2018.

(51) Int. Cl.
*H04W 48/12* (2009.01)
*H04L 1/1607* (2023.01)
(Continued)

(52) U.S. Cl.
CPC ........... *H04W 48/12* (2013.01); *H04L 1/1671* (2013.01); *H04L 1/1858* (2013.01);
(Continued)

(58) Field of Classification Search
CPC .. H04W 48/12; H04W 52/367; H04L 1/1671; H04L 1/1858; H04L 1/1896; H04L 1/189
See application file for complete search history.

(56) References Cited

U.S. PATENT DOCUMENTS 11,201,661 B2 * 12/2021 Venugopal ........ H04W 74/0833
2014/0200003 A1    7/2014 Kodali et al.
(Continued)

FOREIGN PATENT DOCUMENTS

| CN | 102833788 A | 12/2012 |
| CN | 103634858 A | 3/2014 |

(Continued)

OTHER PUBLICATIONS

Pérez-Nicoli, Pablo, et al. "Uplink wireless transmission overview in bi-directional VLC systems." 2016 IEEE International Conference on Electronics, Circuits and Systems (ICECS). IEEE, 2016. (Year: 2016).*

(Continued)

*Primary Examiner* — Sharad Rampuria
(74) *Attorney, Agent, or Firm* — Robert P. Michal, Esq.; Carter, DeLuca & Farrell LLP

(57) ABSTRACT

Systems, methods, apparatuses, and computer program products for handling limited or unavailable uplink (UL). One method may include receiving, from a user equipment, an indication that uplink transmission is limited or unavailable.

14 Claims, 9 Drawing Sheets

(51) Int. Cl.
  *H04L 1/1829* (2023.01)
  *H04L 1/1867* (2023.01)
  *H04W 52/36* (2009.01)

(52) U.S. Cl.
  CPC ......... *H04L 1/1896* (2013.01); *H04W 52/367* (2013.01); *H04L 1/189* (2013.01)

(56) References Cited

U.S. PATENT DOCUMENTS

| | | | |
|---|---|---|---|
| 2015/0208263 A1* | 7/2015 | Behravan | H04B 7/0632 370/252 |
| 2015/0264637 A1* | 9/2015 | Zaus | H04W 48/16 455/434 |
| 2018/0227094 A1 | 8/2018 | Liu et al. | |
| 2018/0368081 A1* | 12/2018 | Akkarakaran | H04W 52/365 |
| 2020/0068493 A1* | 2/2020 | Ding | H04W 52/325 |
| 2020/0112927 A1* | 4/2020 | Han | H04W 52/365 |
| 2020/0136715 A1* | 4/2020 | Venugopal | H04W 72/0453 |

FOREIGN PATENT DOCUMENTS

| | | |
|---|---|---|
| CN | 104718783 A | 6/2015 |
| EP | 2830348 A1 | 1/2015 |
| WO | 2013/191636 A1 | 12/2013 |

OTHER PUBLICATIONS

Hande, Prashanth, et al. "Extended Reality over 5G-Standards Evolution." IEEE Journal on Selected Areas in Communications (2023). (Year: 2023).*

"Radio Frequency Safety", Federal Communications Commission, Retrieved on Mar. 31, 2021, Webpage available at : https://www.fcc.gov/general/radio-frequency-safety-0.

"3rd Generation Partnership Project;Technical Specification Group Radio Access Network;New frequency range for NR (24.25-29.5 GHZ)(Release 15)", 3GPP TR 38.815, V15.0.0, Jun. 2018, pp. 1-22.

"3rd Generation Partnership Project;Technical Specification Group Radio Access Network; NR;User Equipment (UE) radio access capabilities (Release 15)", 3GPP TS 38.306, V15.7.0, Sep. 2019, pp. 1-55.

"3rd Generation Partnership Project;Technical Specification Group Radio Access Network; NR;User Equipment (UE) radio transmission and reception;Part 2: Range 2 Standalone (Release 16)", 3GPP TS 38.101-2, V16.1.0, Sep. 2019, pp. 1-154.

"3rd Generation Partnership Project;Technical Specification Group Radio Access Network; NR;Radio Resource Control (RRC) protocol specification(Release 15)", 3GPP TS 38.331, V15.7.0, Sep. 2019, pp. 1-527.

International Search Report and Written Opinion received for corresponding Patent Cooperation Treaty Application No. PCT/IB2019/059270, dated Jan. 23, 2020, 14 pages.

"NSA and NR—UE Maximum Output Power", TSG-RAN Working Group 4 (Radio) meeting #82, R4-1700446, Agenda : 10.4.2.3, InterDigital, Feb. 13-17, 2017, 7 pages.

Office action received for corresponding European Patent Application No. 19797815.8, dated Mar. 16, 2023, 2 pages.

Office action received for corresponding Chinese Patent Application No. 201980071649.3, dated Sep. 21, 2023, 9 pages of office action and no page of translation available.

* cited by examiner

METHODS AND APPARATUSES FOR LIMITED UPLINK

RELATED APPLICATION

This application claims priority to PCT Application No. PCT/IB2019/059270, filed on Oct. 29, 2019, which claims priority to U.S. Application No. 62/752,098, filed on Oct. 29, 2018, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to methods for communication when uplink (UL) is limited, unavailable, or cannot be used, for example, in 5G.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

One embodiment may be directed to a method that may include receiving, from a UE, an indication that the UL transmission is limited or unavailable.

Another embodiment may be directed to an apparatus including at least one processor and at least one memory comprising computer program code. The at least one memory and computer program code configured, with the at least one processor, to cause the apparatus at least to: receive, from a UE, an indication that the UL transmission is limited or unavailable.

In an embodiment, the receiving of the indication may comprise receiving a user equipment capability information or one or more other information elements from the user equipment.

In an embodiment, the method may also include determining whether the UE is able to report when there is a problem with the uplink transmission based on the UE capability information or one or more other information elements, when it is determined that the UE is able to report when there is a problem with the UL transmission, configuring the UE to report when there is a problem with the UL transmission, and the receiving of the indication may include receiving a report from the user equipment indicating that there is a problem with the uplink transmission being unavailable or limited.

In an embodiment, if the UL is still working but limited, the receiving of the report may include receiving an indication including a combined layer 2 UCI and RRC layer measurement result(s), wherein the layer 2 UCI may be used to prevent releasing the UE connection with a radio link failure (RLF) procedure in case no more acknowledgements are received from the UE.

In an embodiment, the method may also include performing actions based on a measurement result(s) previously received from the UE, where the measurement result(s) may include neighboring cell measurement(s) including an indication about the strongest neighboring cells, which may also include a usability estimation that is based on the antenna locations, directions and/or based on the UL buffer status.

In an embodiment, the receiving of the report may include receiving an indication including an estimation about the DL quality and/or possibility for slow acknowledgement mode that mainly uses DL connection and limited UL connection.

In an embodiment, if the UL cannot be used at all, then the receiving of the report may include receiving the report, via another network node. In some examples, the another network node may include a LTE node or 5G node.

In an embodiment, the method may also include at least one of configuring to activate reduced acknowledgement mode for the DL, or beginning a handover (HO) procedure, for the UE, to a cell having better UL usability or availability.

In an embodiment, the activating of the reduced acknowledgement mode may include configuring to schedule slow acknowledgement via RRC, or repeating transmission of data for a predefined number of times and, when a DL acknowledgement of the data transmission from the UE is not received, continuing with transmission of a next data packet.

Another embodiment may be directed to a method that may include transmitting an indication to the network that the UL transmission is limited or unavailable.

Another embodiment may be directed to an apparatus including at least one processor and at least one memory comprising computer program code. The at least one memory and computer program code configured, with the at least one processor, to cause the apparatus at least to: transmit an indication to the network that the UL transmission is limited or unavailable.

In an embodiment, the transmitting of the indication may comprise transmitting to the network user equipment capability information or one or more other information elements.

In an embodiment, the method may also include receiving configuration to report when there is a problem with the uplink transmission, detecting that there is a problem with the uplink transmission, and the transmitting of the indication may include transmitting a report to the network indicating that there is a problem with the uplink transmission being unavailable or limited.

In an embodiment, if the UL is still working but limited, the transmitting of the report may include transmitting an indication including a combined layer 2 UCI and RRC layer measurement result(s), wherein the layer 2 UCI may be used to prevent releasing the UE connection with a RLF procedure in the case where no more acknowledgements are sent by the UE.

In an embodiment, the UE measurement result(s) may include neighboring cell measurement(s) including an indication about the strongest neighboring cells, which may also include a usability estimation that is based on the antenna locations, directions and/or based on the UL buffer status.

In an embodiment, the transmitting of the report may include transmitting an indication including at least one of an estimation about the DL quality and a possibility for slow acknowledgement mode to use a DL connection and limited UL connection.

In an embodiment, if the UL cannot be used at all by the UE, then the transmitting of the report may include transmitting the report, via another network node.

In an embodiment, the method may include receiving from the network, a configuration to activate reduced acknowledge mode for the downlink, or a HO command to begin a HO procedure to a cell having better usability or availability.

BRIEF DESCRIPTION OF THE DRAWINGS

For proper understanding of example embodiments, reference should be made to the accompanying drawings, wherein.

DETAILED DESCRIPTION

Figure 1:
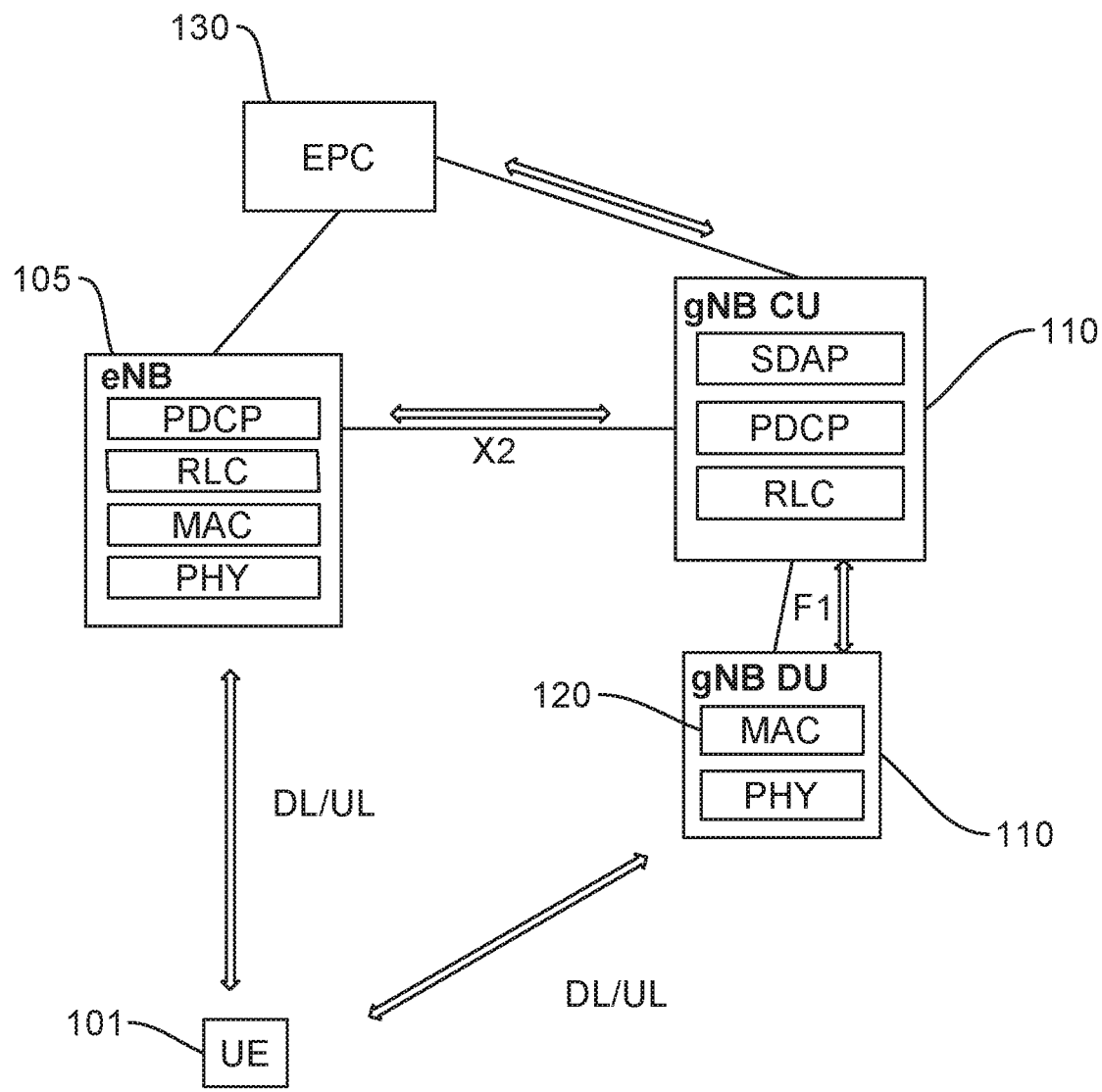
FIG. 1 illustrates an example system, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for handling limited or unavailable uplink (UL), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain consumer and industrial products make use of electromagnetic energy, such as radio frequency (RF) energy, which may potentially be harmful to humans who are exposed to such energy. As a result, the Federal Communications Commission (FCC) has adopted rules that set limits for human exposure. There are two sets of exposure limits: occupational/controlled limits, and general population/uncontrolled limits.

The exposure limits are Maximum Permissible Exposure (MPE) limits averaged over the body and averaged over time. The occupational/controlled limits are five times higher than the general population/uncontrolled limits at frequencies above 3 MHz. Currently, the averaging period for occupational/controlled exposure is six minutes for exposure to frequencies below 15 GHz; however it is noted that this period may be changed by the FCC. The averaging time decreases as the frequency increases from 15 GHz to 300 GHz. The FCC does not allow time averaging for general population/uncontrolled exposure. In addition, the MPE limits are the same for both the electric field and the magnetic field.

As can be seen from the exposure safety regulations outlined above, different rules are defined for frequencies below 15 GHz than for those above 15 GHz.

Meanwhile, in 5G, frequency bands higher than 15 Ghz are defined, such as 28 GHz. More specifically, 3GPP defines, for example, a new frequency range for NR of 24.25-29.5 GHz. It noted that this frequency range may be updated or expanded, and therefore examples discussed herein are not specifically limited to this frequency range.

The FCC MPE rules, together with the 3GPP-defined new frequency ranges, raises new challenges for mobile networks. Since the MPE rules require less exposure at higher frequencies like those defined for 5G, without new approaches it may be that 5G would not comply with the MPE rules at the defined frequencies.

Very high frequencies, such as 28 Ghz, also require a narrow beam and/or beam antenna to provide adequate power level at the receiving end. This kind of narrow beam makes the power density per square centimetre close to the transmitting antenna very high. For the downlink (DL) direction where the network sends data to the UE, the power density in the user's skins is very minimal because typically the distance to the end user is quite high. In contrast, for the UL direction, the distance can be very low as the UE may be in the user's hands or close to their head. Now, a narrow beam together with the high frequency FCC rules makes the sending antenna very sensitive to the closeness of the human body. In fact, it is possible that the human body limits or prevents the UL usage from the UE. Some UE vendors have developed a skin radar that they can use to detect human skin closeness and, when needed, limit UL power or even stop UL transmission.

Mobile services, such as 5G, have been designed so that for a transmitted DL data packet the network receives acknowledgements or feedback on many levels and indications from the UE. If an acknowledgement (e.g., UCI, CSI, RI, HARQ ACK/NACK, and/or TCP ACK/NACK) is not received, the network may repeat transmission of the same data again. This way, connection reliability can be guaranteed or improved. As a result, if the FCC rules prevent UL usage or reduce UL power, this may also impact the DL direction even if it would work well. Without acknowledgements from the UE, the network would keep repeating transmission of the same data until the connection is disconnected. However, the 5G system has not been designed to work with poor or non-existing UL connection.

Accordingly, certain embodiments provide solutions that can be used when UL is limited or not working or cannot be used, for example, in 5G.

In some embodiments, the network may obtain or receive UE capability information from the UE. According to an embodiment, the network may then check the UE capability information for a new capability information element(s) (IEs) indicating limited or unavailable UL. This new capability information element may include one or more fields or IEs used to indicate that UL is limited or not available. In some example embodiments described herein, the capability IE(s) for indicating limited or unavailable UL may be referred to as a MPE capability field or MPE capability IE. However, it is noted that "MPE capability field or IE" is just an example of one naming convention for the capability IE.

In certain embodiments, the presence of the limited/ unavailable UL or MPE capability information element would indicate to the network whether the UE supports indicating, in its measurement report, whether there is a problem with UL transmission. The network may then configure the UE to report when the UL is restricted or unavailable. In certain embodiments, the term "FCC MPE" or "MPE" may be used herein to indicate the behavior when a UE detects that it cannot transmit or has limited UL to a 5G or mmWave cell in UL, for example, due to the FCC MPE requirement restricting the transmit power through the human body. However, this behavior or functionality can be used in a general manner when UL cannot be used due to obstruction in certain cell(s) in UL.

According to an embodiment, the UE may use sensors to detect when there is a problem with UL usage or power (i.e., when the UL is restricted or unavailable). If the UE detects the UL problem, it may indicate the problem to the end user, e.g., with sound, info text, figure or figural change, color blinking and/or vibration. The indication may be a short notification, may indicate ending of the problem or may continue until problem ends. Such an indication may prompt the user to take some action to take corrective action to restore or improve UL usage. For example, the end user may take action to make sure to not cover all antennas on the UE. In an embodiment, the UE may start an indication procedure to indicate to the network the possible UL limitation or problem, as discussed in the following.

In one embodiment, if the UL is still working and the UE has a SRB, such as signaling radio bearer 3 (or any other type of SRB) configured, then the UE may send a combined layer 2 uplink control and feedback information (e.g., UCI) and radio resource control (RRC) layer measurement result to the network. The layer 2 indication may be used to prevent the network from releasing the connection with the radio link failure (RLF) procedure (or due to data inactivity) in case it does not receive any more acknowledgements from the UE. Instead, when the network notices that the UE is not responding with acknowledgements, it may trigger the gNB RRC layer to perform actions based on the measurement result(s) already received and/or based on the indication(s) received from the UE. In this case, the distributed unit (DU) may send a new indication message with the already received measurement results to a central unit (CU).

According to a further embodiment, if the UE detects that 5G UL cannot be used at all based on its sensors or link budget estimation, the UE may send an indication to the network, for example by using LTE RRC layer (or other suitable UL layer such as another 5G carrier). In this case, the indication may be on the RRC layer but may also include lower layer acknowledgement and information element. The indication may include an estimation about the DL quality and/or possibility for new slow acknowledgement mode that aims to use mainly DL connection and very minimal UL.

In an embodiment, the measurement result(s) may include neighboring cell measurement(s) including an indication about the strongest neighboring cells included with usability estimation. The UE may perform this usability estimation based on the antenna locations, directions and/or based on the UL buffer status. The indication may also include an estimation about the DL quality and/or possibility for new slow acknowledgement mode that aims to use mainly DL connection and very minimal UL.

According to certain embodiments, if the network receives such an indication from the UE, a gNB upper or higher layer (e.g., RRC layer) can make the decision on how to continue in this situation. In one embodiment, the gNB upper layer (e.g., RRC layer) may either reconfigure a gNB lower layer (e.g., the MAC layer) to start DL data with reduced acknowledgements and/or reduced DL data rate or may suspend the DL in case it starts a handover procedure to a cell having better UL usability.

In an embodiment, when the gNB upper layer (e.g., RRC layer) decides to switch to reduced acknowledgement mode, it may send the acknowledgement(s) and information element(s) to the gNB lower layer (e.g., MAC layer) with a new indication message(s) or with a new information element(s). The lower (e.g., MAC) layer knows that the UL problem exists and it can start actions based on the information element. For example, the lower layer may begin scheduling with a new K value, e.g. K=4, meaning slow acknowledgement via LTE RRC. According to one embodiment, the UE may also be configured with the new reduced acknowledgement configuration. In this mode, the gNB lower layer repeats the data as many times as defined based on the UE feedback or acknowledgement (ACK) discussed above and, if it does not receive DL ACK, it continues with the next data packet. If the UE detects that it can use UL, it may at any time send an acknowledgement also via 5G UL.

FIG. 1 illustrates an example system depicting an example of a non-standalone (NSA) 3× option where a UE 101 may send and/or receive data either from eNB 105, gNB 110 or from both, according to some embodiments. In the example of FIG. 1, if DL information is sent for example from gNB 110, then DL acknowledgements may also be sent by using gNB UL. Based on the problems described in the foregoing, it may be that the UE cannot use the UL at all or can only use UL in a limited fashion. However, in order to have the DL working without UL, the DL related acknowledgements would also need to be delivered, e.g., to the 5G medium access control (MAC) layer 120 in gNB DU. In addition, MAC hybrid automatic repeat request (HARQ) feedback is meant for very fast feedback to repeat the needed data. Now, when the UE 101 does not have UL at all and is using only eNB 105 UL, the latency may be too large from the UE 101 to 5G MAC layer 120. This would lead to a major degradation of DL throughput or even to full failure.

Figure 5:
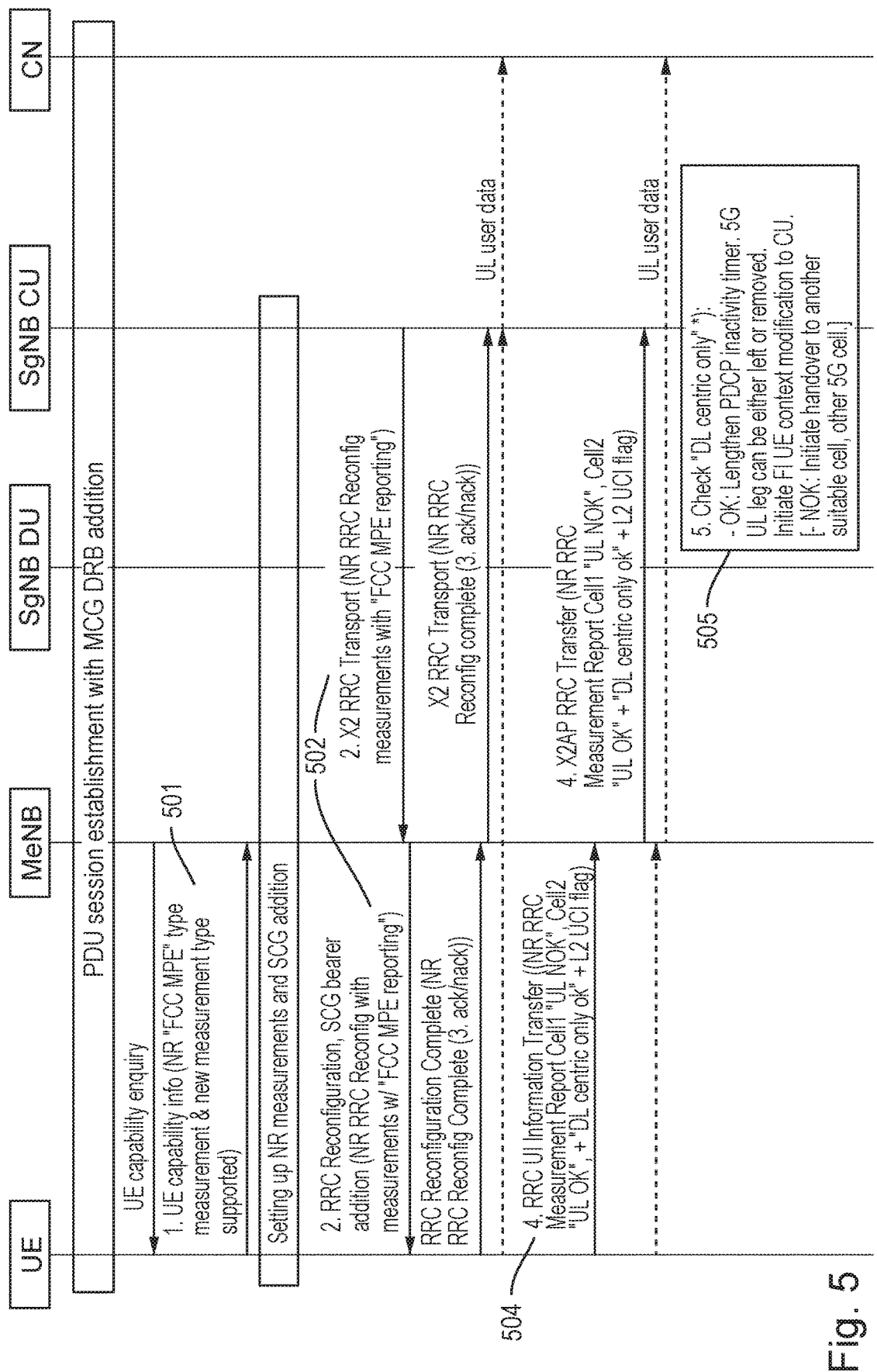
FIG. 5 illustrates an example signaling diagram, according to an embodiment.
Figure 5:
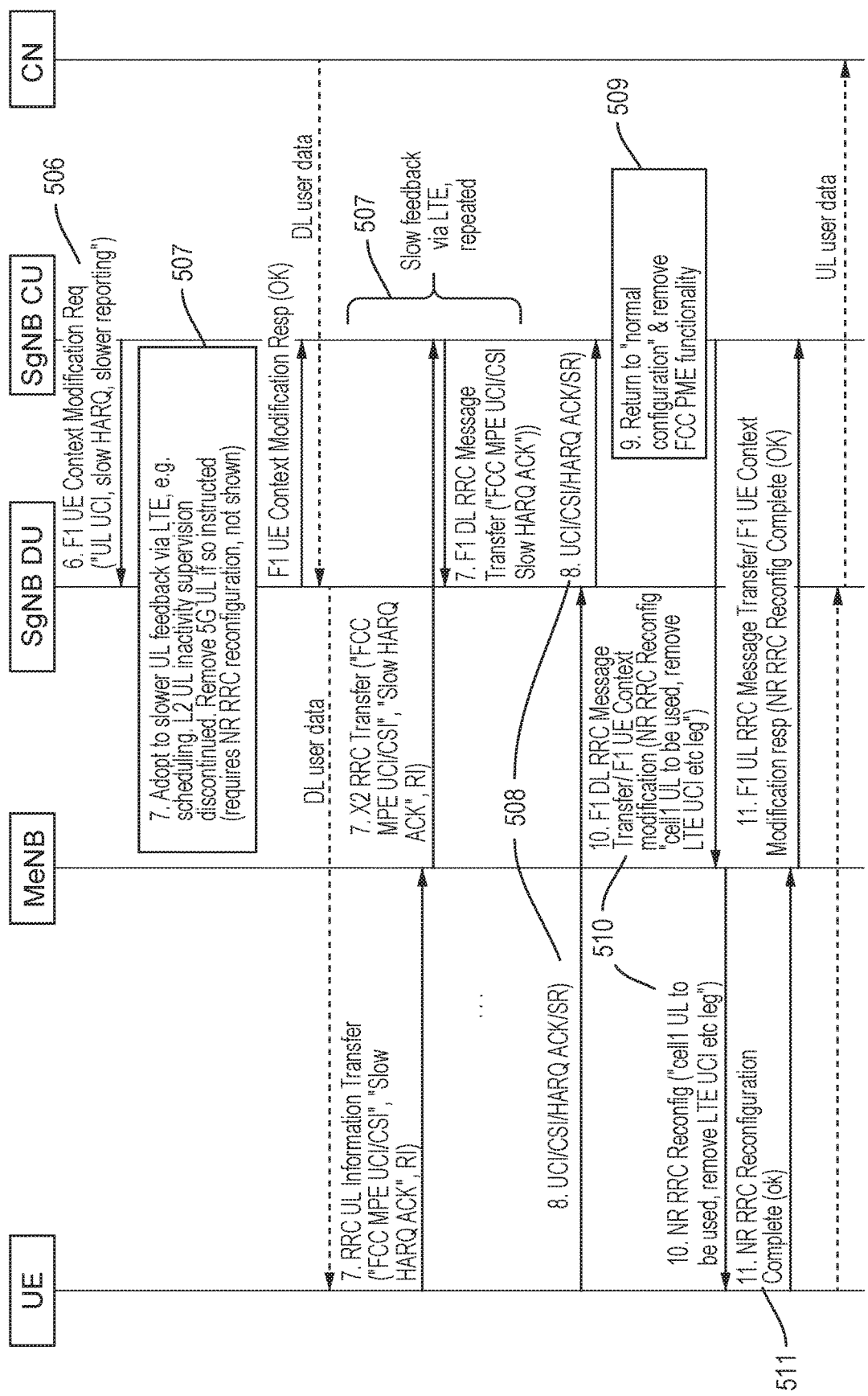
Figure 6:
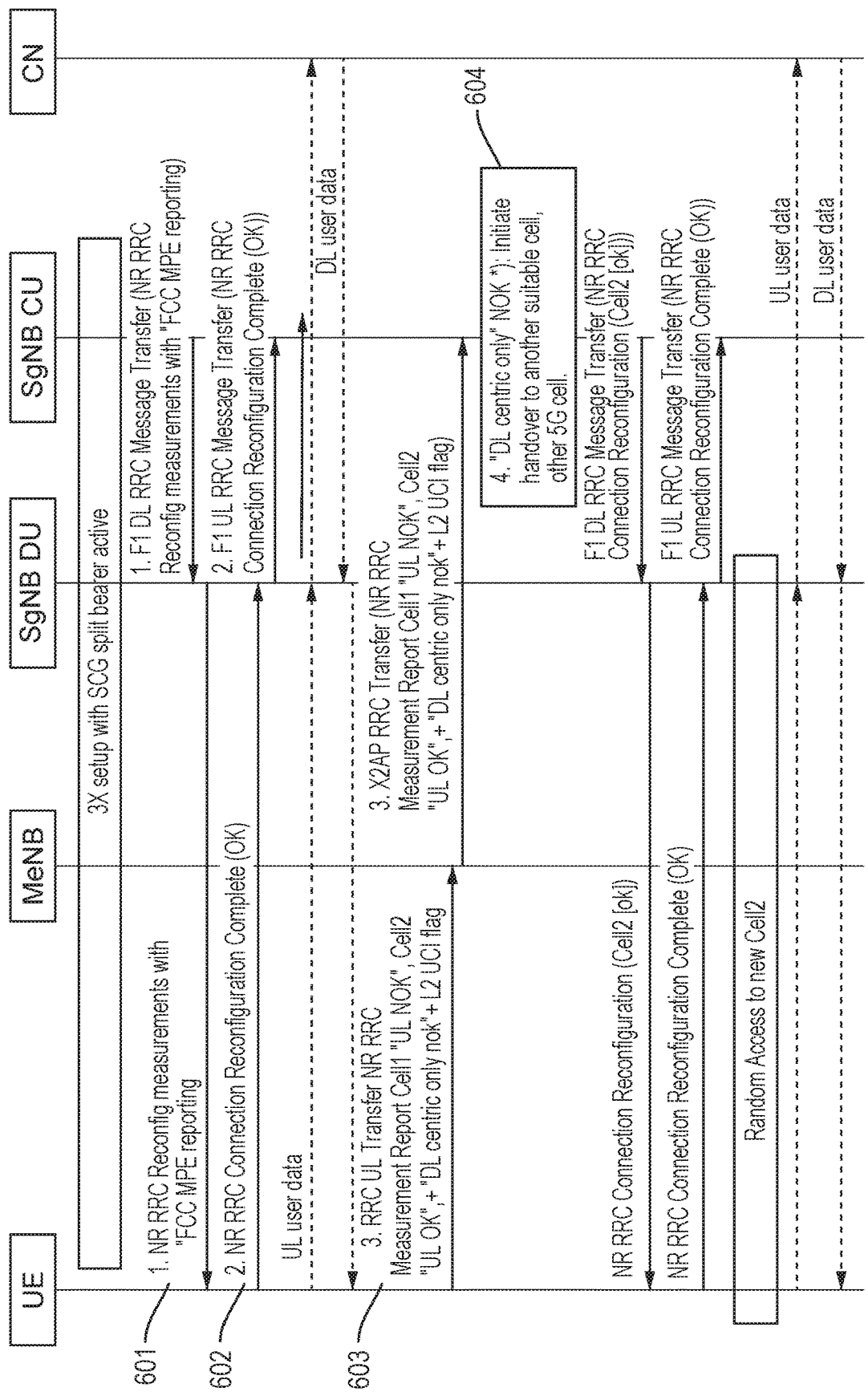
FIG. 6 illustrates an example signaling diagram, according to an embodiment.

According to an embodiment, to prevent the degradation in DL throughput, a new reduced acknowledgement mode may be used. In one example, under this reduced acknowledgement mode, the gNB 110 may receive DL data quality reports from the UE 101 via LTE RRC (or via another 5G RRC UL carrier, e.g., on lower band) instead of 5G DL HARQ process. The DL data quality report may indicate how only DL is working or whether the gNB 110 should increase or decrease the automatic data repetition. In some embodiments, the DL data quality report may also indicate the number of repetition for HARQ and RLC or may indicate if the quality is not good enough and needs to be disconnected. The gNB RRC may deliver the report in gNB, for example, by using a new CU to DU report message, as illustrated in the examples of FIGS. 5-7 discussed below. In an embodiment, the MAC layer 120 in gNB 110 may then use the number of HARQ repetitions and may repeat all scheduling after a failed acknowledgement, as requested, and after that considers the delivery successful.

Figure 2:
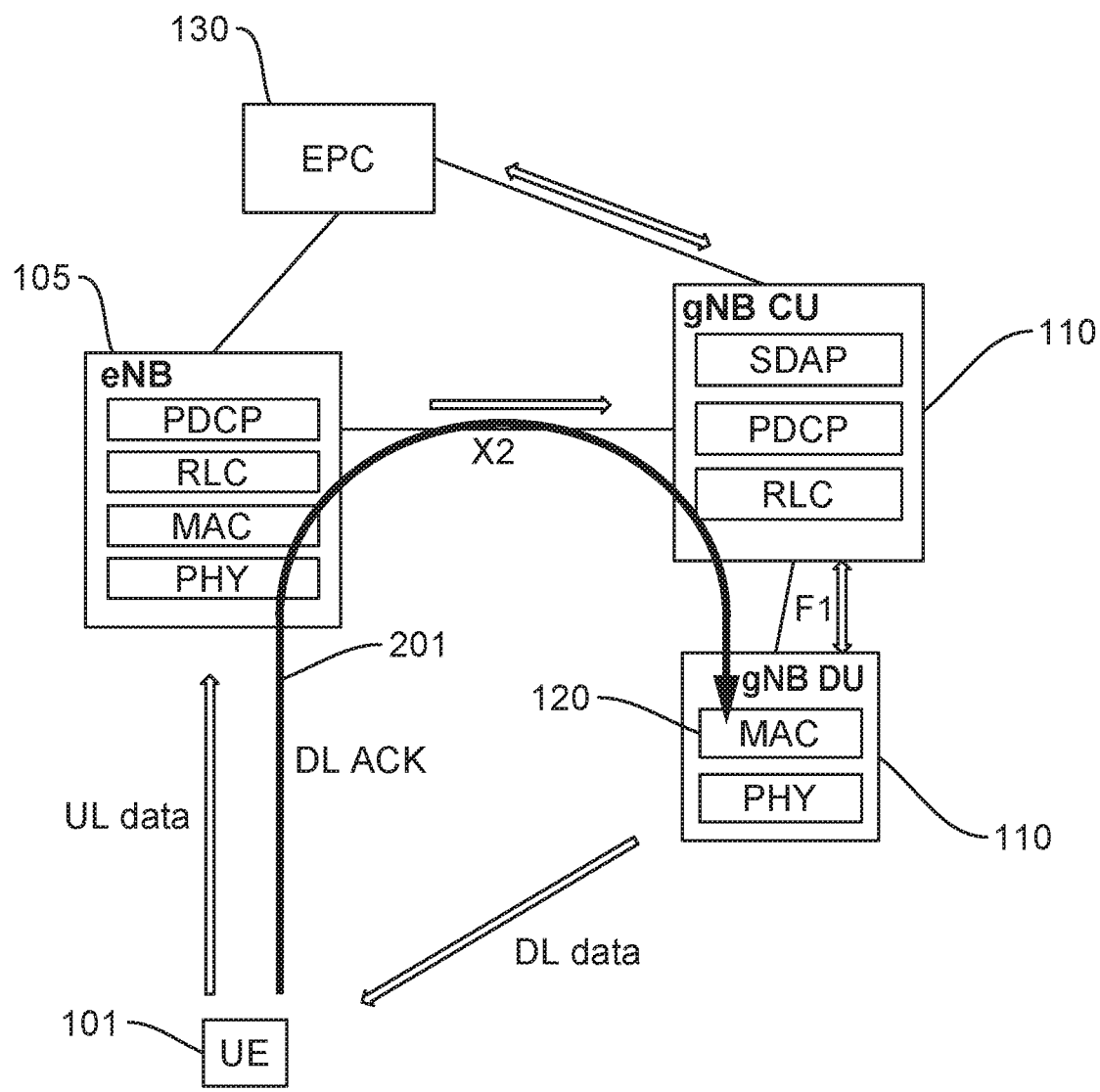
FIG. 2 illustrates an example system, according to an embodiment.

FIG. 2 illustrates another example system depicting a NSA 3× option where a UE 101 may receive DL data from gNB 110 but transmits UL data to eNB 105, according to some embodiments. As illustrated in the example of FIG. 2, a new route 201 may be provided for the acknowledgment from the UE 101 through the eNB 105 and then to the MAC layer of gNB 110.

Figure 3:
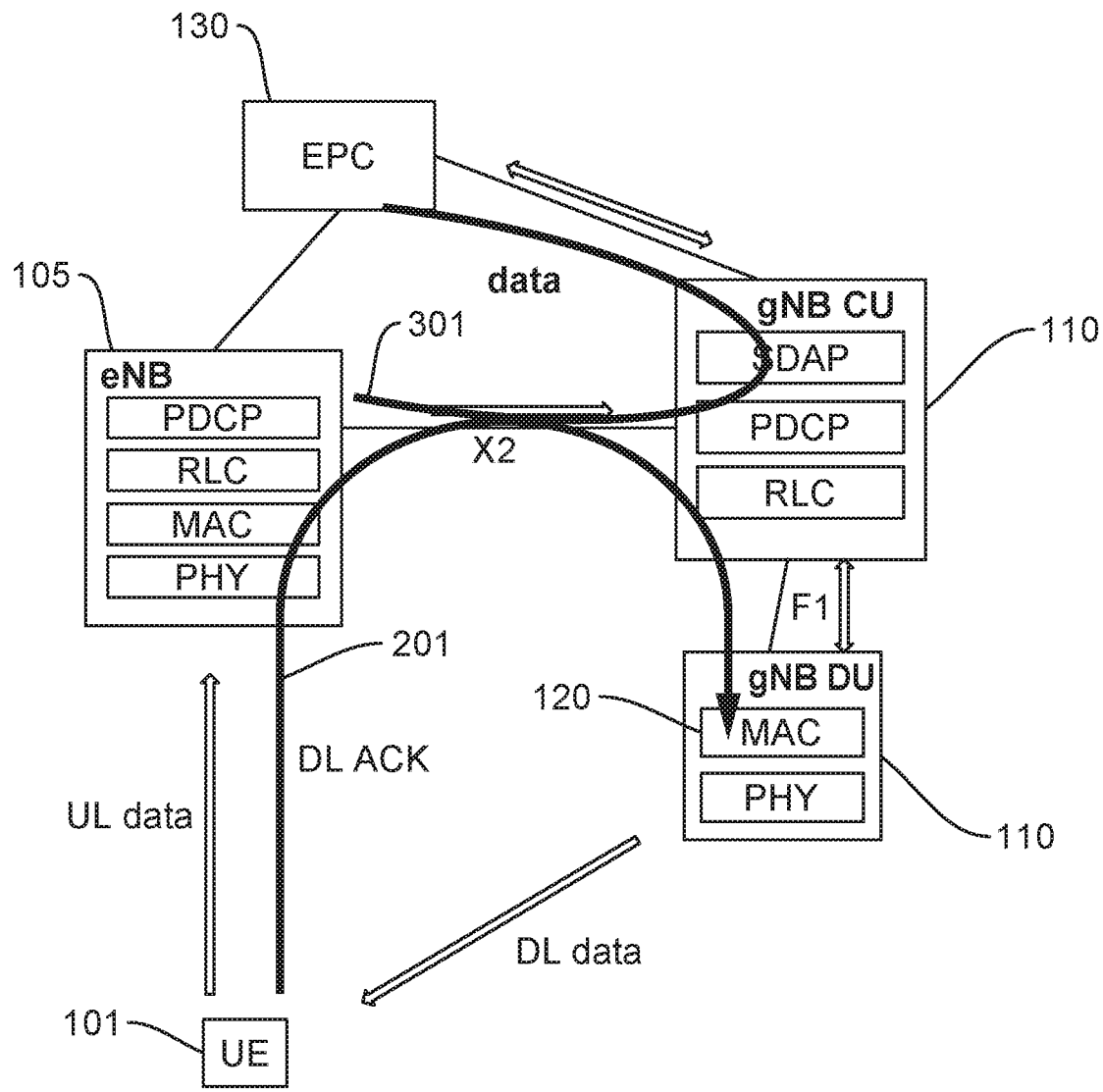
FIG. 3 illustrates an example system, according to an embodiment.

FIG. 3 illustrates another example system depicting a NSA 3× option where a UE 101 may receive DL data from gNB 110 but transmits UL data to eNB 105, according to some embodiments. In an example, it may be that the UE 101 is using a type of DL service where some errors can actually be corrected, or where it does not matter if there are some errors, such as with video. As mobile networks are typically based on multi-layer protocols where data repetitions are handled by multiple protocols, if there are still some errors after the automatic repetition, the data repetition can be handled by a higher layer like TCP/IP. Such mechanisms can be used with stringent bit or block error rate requirements. In the example of FIG. 3, the normal UL data can be routed, via route 301, to PDCP layer of gNB 110 and from there to the evolved packet core 130. As such, the needed TCP/IP repetitions can work normally.

Figure 4:
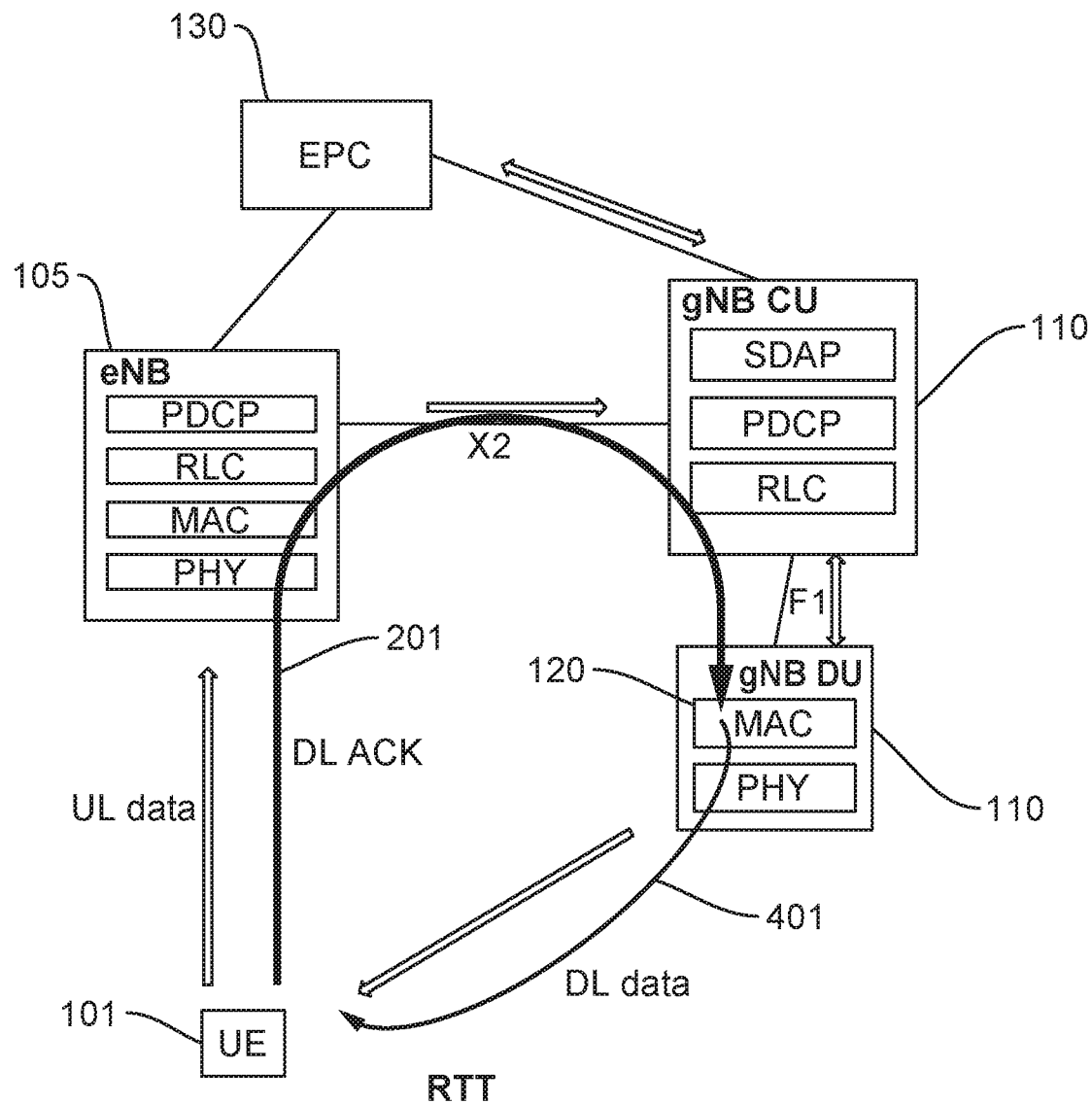
FIG. 4 illustrates an example system, according to an embodiment.

FIG. 4 illustrates another example system depicting a NSA 3× option where a UE 101 may receive DL data from gNB 110 but transmits UL data to eNB 105, according to some embodiments. In the example embodiment of FIG. 4, when the RRC of gNB 110 receives an UL problem indication indicating reduced acknowledgement mode via LTE RRC, it may immediately send a new round trip time (RTT) request 401 for the UE 101 by using 5G DL. The UE 101 may respond using the LTE UL (or another 5G UL). Once the CU of gNB 110 receives the request, it can calculate RTT for the UE 101. The gNB 110 can use the RTT information for the reduced acknowledgement mode. If the RTT is very good, the gNB 110 may even configure the UE 101 to use existing type of RLC/HARQ acknowledgement modes via LTE UL (or another 5G UL). Alternatively, this measurement can be done from MAC to MAC.

In another embodiment, the UE 101 may report a new measurement type. This new measurement type may be configured to the UE 101 by the network. The existing measurement configuration cannot be used for this purpose as, in this case, DL level and UL level can be very good. In addition to normal DL measurement, the UE may need to perform an analysis of the usability of the UL. The UE may report DL for all neighbouring cells normally, but mark those cells with UL FCC restricted that it estimates it will not be able to use for the needed UL data. The UE may perform this usability estimation based on the antenna locations, directions, and/or based on the UL buffer status. The measurement may also include DL quality analysis to be used for the fixed data repetition introduced above.

In another embodiment, the new reduced acknowledgement mode may be used to connect, for example, intra RAT 5G gNBs, LTE eNBs, or LTE gn-eNB(s) (with 5G core) and/or extend the usage scenarios to supplemental UL (SUL) and/or carrier aggregation (CA) cases as well.

FIG. 5 illustrates an example signaling diagram, according to one embodiment. FIG. 5 illustrates an example in which 5G SgNB DL continues to be used, with uplink control information reporting via LTE MeNB, after FCC MPE is detected with UCI. The example of FIG. 5 depicts a scenario in which the LTE eNB is acting as dual connectivity master node and the 5G gNB is acting as a secondary node. It is noted, however, that other scenarios are possible, for example, with both nodes being 5G gNBs, LTE eNBs, LTE ng-eNBs or any possible dual connectivity scenario involving 5G gNB, LTE eNB and/or LTE ng-eNB (where LTE ng-eNB refers to LTE connected 5G core). Also, the example scenario depicted in FIG. 5 uses LTE SRB2 for the UE; however, other types of SRB may be used according to example embodiments. For instance, according to an embodiment, if SRB3 is established, the NR RRC reconfiguration and measurement may then be sent over SRB3 directly between the SgNB and UE. According to an embodiment, instead of SCG bearer or split SCG bearer, MCG or split MCG bearer can be used. In these cases, the "NB" related actions can be split differently, e.g., SgNB actions may be carried out partially or completely by "MeNB" (LTE eNB or LTE ng-eNB).

As illustrated in the example of FIG. 5, at 501, UE capability information may be transmitted and may include an additional indication of whether the UE supports indicating, e.g., in measurement report, whether the cell is satisfactory or not for UL (e.g., with respect to FCC MPE or other similar situations). Also, capability information may include if UE is capable of indicating whether the application, data stream and/or radio bearer can be used in downlink intensive manner, e.g., using 5G downlink with (significantly) higher bit rate compared to uplink or with no corresponding uplink user data or application control information, such as TCP acknowledgements. Also, in an embodiment, the UE capability information may include a new secondary NB measurement type via MeNB UL. The UE capability information may contain one or more separate or combined attributes for the above aspects and/or they may be combined with other information. In an embodiment, at 502, the RRC reconfiguration may configure the measurement report with a request to report "FCC MPE/limited UL" support.

According to certain embodiments, at 503, the RRC reconfiguration complete may contain an explicit indication of whether the FCC MPE/limited UL configuration is accepted (e.g., per request/measurement object, etc.). Then, when needed, the UE may send, at 504, a NR RRC measurement report indicating for cells whether the UL can be used normally or if UL transmission is restricted for any reason, such as due to the FCC MPE requirement. In some embodiments, upon receiving the NR RRC measurement report, the SgNB may perform appropriate actions. In certain embodiments, at 505, the SgNB CU may decide whether to start to use limited UL based on UE measurement information or whether to initiate handover. The SgNB may decide this alternatively or additionally based on PDCP data volume for the SCG (split) bearer(s), pre-configurations based on operator preference, any application and/or quality of service related aspects of the (split) bearer, UE's other bearers and/or user or UE related information, allowed services/functionality and/or restrictions, e.g., on UE capabilities, mobility restrictions, NW slices, allowed services and areas, allowed quality of services, etc. For example, if the measurement report indicates that a cell can be used in UL ("UL ok"), then the SgNB may lengthen the PDCP inactivity timer(s) and the 5G UL leg may either remain or be removed. However, if the measurement report indicates that a cell is not suitable ("UL NOK"), then the SgNB may for example initiate handover to another suitable cell or other 5G cell. One or more cells can be treated as described in this paragraph.

As further illustrated in the example of FIG. 5, at 506, the SgNB CU may modify the UE context, and may provide UCI and/or other quality related information for SgNB DU scheduling and for adopting slower feedback. The UCI and other quality information may include channel state information (CSI), precoding matrix information (PMI), HARQ ack/nack, (MIMO) rank indication (RI) and/or transmit power control (TPC). In an embodiment, 5G gNB may also adopt DL scheduling in a more robust manner due to "FCC MPE" (or other limited uplink) condition, which may include lower coding and modulation rate to ensure better UE reception of the DL data in case some quality variations or degradation over the (air) interface; the 5G gNB may increase repetition of DL data during the condition; and/or the 5G gNB may increase the transmission power, MIMO transmission streams and decrease the MIMO rank, i.e., send the same data from more antennas to ensure better reception at the UE. If the 5G gNB DL scheduling (and coding and modulation algorithm etc.) can be adjusted dynamically based on the UE feedback, and, for example if the conditions improve, a less "robust" approach can be used for DL data, e.g., in scheduling, coding and modulation, MIMO stream and rank selection, etc. Based on the UE uplink control information feedback, in an embodiment, at 507, the SgNB may adopt slower UL feedback via LTE and to discontinue L2 UL inactivity supervision, and may remove 5G UL if so instructed. The uplink feedback may be repeated and the 5G gNB scheduler can adjust its 5G down link data scheduling etc accordingly as described above.

According to an embodiment, at 508, the UE may send UCI (or other) feedback, directly via 5G gNB (or LTE MeNB), to indicate that the 5G UL link is again fine or available. Alternatively, the UE may send 5G RRC measurement report to indicate that the cell is now available. In one example, at 509, the 5G gNB may return to normal 5G UL mode, e.g., removing "FCC MPE/limited UL" functionality. Then, at 510, the 5G gNB CU may send a modification to 5G gNB DU and UE to remove "FCC MPE/limited UL." According to certain embodiments, at 511, the removal of the "FCC MPE/limited UL" functionality may be acknowledged by the UE and MeNB. In certain embodiments, the UCI may be included as a separate NR RRC message, included in LTE RRC message, and/or included as one or more information elements and copied further to X1 and F1 messages as information element(s), or any combination thereof.

FIG. 6 illustrates another example signaling diagram, according to an embodiment. FIG. 6 illustrates an example in which NR SRB3 is used until the UL connection is restricted, after which LTE SRB2 is used instead. It is noted that SRB3 and SRB2 are provided as example scenarios and other types of SRBs may be used according to other example embodiments. As illustrated in the example of FIG. 6, at 601, the RRC reconfiguration may configure the measurement report with a request to report "FCC MPE/limited UL" support. In an embodiment, at 602, the RRC reconfiguration complete message may contain the explicit indication of whether the "FCC MPE/limited UL" configuration is accepted (e.g., per request/measurement object, etc.) According to certain embodiments, at 603, a NR RRC measurement report may indicate for cells whether the UL can be used normally or if due to limited UL or FCC MPE requirement (or other reason) UL transmission needs to be restricted.

In certain embodiments, if the UE is having SRB3, the UE may ask for DRB3 resources over 5G UL when the 5G UL is available, or such resources can be allocated repeatedly (continuously, with certain interval, etc.) in order for the UE to send UCI when the 5G SRB3 becomes available after the "FCC MPE" (or similar) condition. Another example is that the UE can indicate via LTE eNB the need for 5G UCI resources when the resources are available or repeatedly to have them ready when the 5G UL and SRB3 is available.

In one embodiment, at 604, the 5G gNB may decide to make handover based on UE reporting and/or alternatively or additionally based on PDCP data volume for the SCG (split) bearer(s), pre-configurations based on operator preferences, any application and/or quality of service related aspects of the (split) bearer, UE's other bearers and/or user or UE related information, allowed services/functionality and restrictions, e.g., based on UE capabilities, mobility restrictions, (used or allowed) network slices, allowed services and areas, allowed quality of services, etc. For example, if the measurement report indicates that a cell cannot be used in UL ("UL NOK"), then the SgNB may initiate handover. In addition, the (split) SCG bearer could be removed and MCG only bearer in LTE used. However, this may not be preferable from operator traffic steering perspective as operator cannot use the 5G access to alleviate traffic. In some embodiments, the example of FIG. 6 may further include the eventual removal of FCC MPE/limited UL in a similar manner to steps 508-511 of FIG. 5.

Figure 7A:
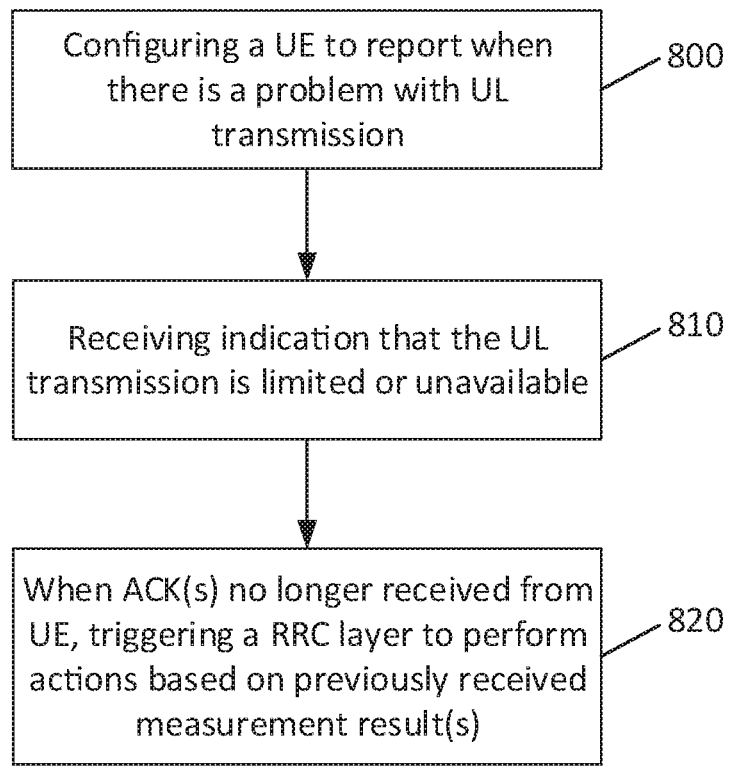
FIG. 7a illustrates an example flow diagram of a method, according to an embodiment.

FIG. 7a illustrates an example flow diagram of a method for handling limited or unavailable UL, according to an example embodiment. In certain example embodiments, the flow diagram of FIG. 7a may be performed by a network entity or network node in a 3GPP communication system, such as LTE or 5G NR. For instance, in some example embodiments, the method of FIG. 7a may be performed by a base station, eNB, gNB, or the like in a LTE, 5G or NR system.

In one embodiment, the method of FIG. 7a may include, at 800, configuring a UE to report when there is a problem with UL transmission on a cell. For example, the problem with UL transmission may include UL being completely unavailable or may include UL being restricted or limited, for example due to FCC MPE restrictions or some other reason. In some embodiments, the configuring 800 may include receiving or obtaining information providing whether a UE supports indicating when there is a problem with UL transmission. For instance, in one example, the configuring may include receiving UE capability information, checking the UE capability information for a MPE field or limited UL information element field that can be used to indicate if there is a problem with UL transmission, and configuring the UE to report when there is a problem with UL transmission with certain defined information.

In an embodiment, the method of FIG. 7a may also include, at 810, when the UE detects a problem with UL, receiving, from the UE, an indication that the UL transmission is limited or unavailable. According to one embodiment, if the UL is still working but limited and the UE has SRB (e.g., SRB3) configured, the receiving 810 may include receiving an indication including a combined layer 2 UCI and RRC layer measurement result. The layer 2 UCI may be used to prevent releasing the UE connection with a radio link failure (RLF) (or due to data inactivity) procedure in case no more acknowledgements are received from the UE. In certain embodiments, the measurement results may include neighboring cell measurement(s) including an indication about the strongest neighboring cells included with usability estimation. The UE may performs this usability estimation based on the antenna locations, directions and/or based on the UL buffer status. According to some embodiments, the indication may also include estimation about the DL quality and possibility for slow acknowledgement mode that aims to mainly use DL connection and very minimal UL. In one embodiment, if the UL cannot be used at all, then the receiving 810 may include receiving the indication, via LTE upper layer, such as RRC layer, or another 5G node, including a lower layer acknowledgement(s) and information element (IE).

According to one embodiment, when acknowledgements are no longer being received from the UE, the method may include, at 820, triggering a gNB upper (e.g., RRC) layer to perform actions based on the measurement result previously received from the UE and/or based on the indication(s) received from the UE. In certain embodiments, the actions performed by the gNB upper (e.g., RRC) layer may include requesting the gNB lower (e.g., MAC) layer to start or activate reduced acknowledgement mode for DL, or may include suspending the DL and beginning a handover (HO) procedure to a cell having better UL usability or availability. In an embodiment, the activating of the reduced acknowledgement mode may include sending the acknowledgement and IE to gNB lower (e.g., MAC) layer, along with a new indication message or with a new information element. As a result, in the reduced acknowledgement mode, the gNB lower (e.g., MAC) layer may schedule acknowledgement with a new K value that reduces acknowledgement via RRC. Accordingly, in the reduced acknowledgement mode, the gNB lower (e.g., MAC) layer repeats the data as many times as defined and, if it does not receive DL acknowledgement from UE, it continues with next data packet.

Figure 7B:
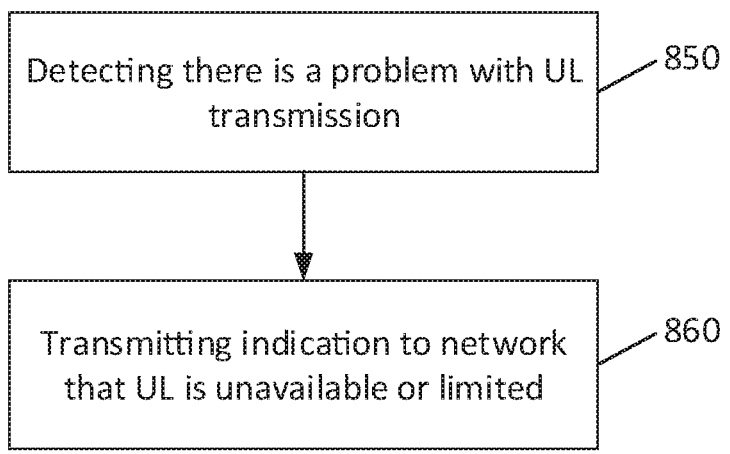
FIG. 7b illustrates an example flow diagram of a method, according to an embodiment.

FIG. 7b illustrates an example flow diagram of a method for handling limited or unavailable UL, according to an example embodiment. In certain example embodiments, the flow diagram of FIG. 7b may be performed by a mobile station, device, user terminal, or UE, which may be associated with a communications system or network, such as a LTE, 5G or NR system. For example, in some embodiments, the method of FIG. 7b may include one or more of the steps performed by the UE illustrated in FIGS. 1-6.

In an embodiment, the method of FIG. 7b may include, at 850, detecting, for example using sensors, that there is a problem with UL transmission on a cell. For example, the problem with UL transmission may include UL being completely unavailable or may include UL being restricted or limited, for example due to FCC MPE restrictions or some other reason. In some embodiments, the UE may be configured by the network to report when there is a problem with UL transmission. In this case, the method may include, at 860, when the UE detects there is a problem with UL, transmitting an indication to the network that UL is limited or unavailable. For instance, in one example, the transmitting 860 may include transmitting UE capability information or other information element that may include a MPE field or limited UL information element field used to indicate when there is a problem with UL transmission.

According to one embodiment, if the UL is still working but limited and the UE has SRB (e.g., SRB3) configured, the transmitting 860 may include transmitting an indication including a combined layer 2 UCI and RRC layer measurement result. The layer 2 UCI may be used to prevent releasing the UE connection with a RLF procedure in case no more acknowledgements are sent by the UE. In certain embodiments, the UE measurement results may include neighboring cell measurement(s) including an indication about the strongest neighboring cells included with usability estimation. As such, in one example, the method may include performing the usability estimation based on the antenna locations, directions and/or based on the UL buffer status. According to some embodiments, the transmitting 860 may include transmitting the indication to also include estimation about the DL quality and possibility for slow acknowledgement mode that aims to mainly use DL connection and very minimal UL. In one embodiment, if the UL cannot be used at all by the UE, then the transmitting 860 may include transmitting the indication, via LTE upper layer (e.g., RRC layer) or another 5G node, including a lower layer acknowledgement(s) and information element (IE). In one example embodiment, the method may then include the UE receiving a HO command, from the network, to begin a HO procedure to a cell having better usability or availability.

Figure 8A:
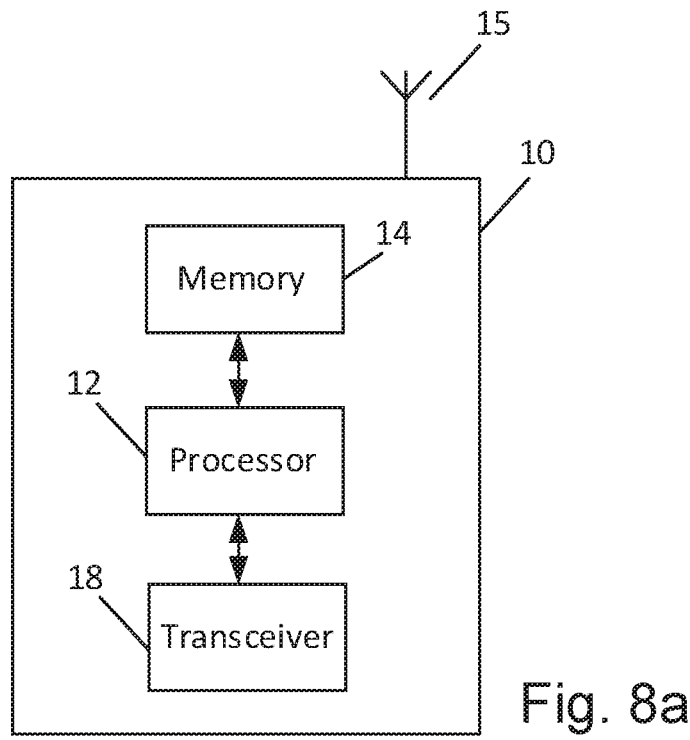
FIG. 8a illustrates an example block diagram of an apparatus, according to an embodiment.

FIG. 8a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), WLAN access point, associated with a radio access network, such as a LTE network, 5G or NR. In example embodiments, apparatus 10 may be an eNB in LTE (e.g., MeNB) or gNB in 5G (e.g., SgNB).

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagrams illustrated in FIGS. 5-8. In some embodiments, apparatus 10 may be configured to perform a procedure for handling limited, restricted or unavailable UL.

For instance, in one embodiment, apparatus 10 may be controlled by memory 14 and processor 12 to configure a UE to report when there is a problem with UL transmission on a cell. For example, the problem with UL transmission may include UL being completely unavailable or may include UL being restricted or limited, such as due to FCC MPE restrictions or some other reason. In some embodiments, apparatus 10 may be controlled by memory 14 and processor 12 to receive or obtain information providing whether a UE supports indicating when there is a problem with UL transmission. For instance, in one example, apparatus 10 may be controlled by memory 14 and processor 12 to receive UE capability information or other information element, to check the UE capability information or other information element for a MPE field or limited UL information element field(s) that can be used to indicate if there is a problem with UL transmission, and to configure the UE to report when there is a problem with UL transmission with certain defined information.

In an embodiment, apparatus 10 may be controlled by memory 14 and processor 12 to receive, when the UE detects a problem with UL, an indication from the UE that the UL transmission is limited or unavailable. According to one embodiment, if the UL is still working but limited and the UE has SRB (e.g., SRB3) configured, apparatus 10 may be controlled by memory 14 and processor 12 to receive an indication including a combined layer 2 UCI and RRC layer measurement result. In one embodiment, apparatus 10 may be controlled by memory 14 and processor 12 to use the layer 2 UCI to prevent releasing the UE connection with a RLF procedure in case no more acknowledgements are received from the UE. In certain embodiments, the measurement results may include neighboring cell measurement(s) including an indication about the strongest neighboring cells included with usability estimation. The UE may performs this usability estimation based on the antenna locations, directions and/or based on the UL buffer status. According to some embodiments, the indication may also include estimation about the DL quality and possibility for slow acknowledgement mode that aims to mainly use DL connection and very minimal UL. In one embodiment, if the UL cannot be used at all, then apparatus 10 may be controlled by memory 14 and processor 12 to receive the indication, via LTE upper layer (e.g., RRC layer) or another 5G node, including a lower layer acknowledgement(s) and information element (IE).

According to one embodiment, when acknowledgements are no longer being received from the UE, apparatus 10 may be controlled by memory 14 and processor 12 to trigger an upper layer, such as RRC layer, to perform actions based on the measurement result previously received from the UE and/or based on the indication(s) received from the UE. In certain embodiments, the actions performed by the upper (e.g., RRC) layer may include requesting the lower layer (e.g., MAC layer) to start or activate reduced acknowledgement mode for DL, or may include suspending the DL and beginning a HO procedure to a cell having better UL usability or availability. In this case, apparatus 10 may be controlled by memory 14 and processor 12 to transmit a HO command to the UE to cause the UE to move the cell having better usability and/or availability. In an embodiment, the activating of the reduced acknowledgement mode may include sending the acknowledgement and IE to gNB lower (e.g., MAC) layer, along with a new indication message or with a new information element. As a result, in the reduced acknowledgement mode, the gNB lower (e.g., MAC) layer may schedule acknowledgement with a new K value that reduces acknowledgement via RRC. Accordingly, in the reduced acknowledgement mode, the gNB lower (e.g., MAC) layer repeats the data as many times as defined and, if it does not receive DL acknowledgement from UE, it continues with transmission of the next data packet.

Figure 8B:
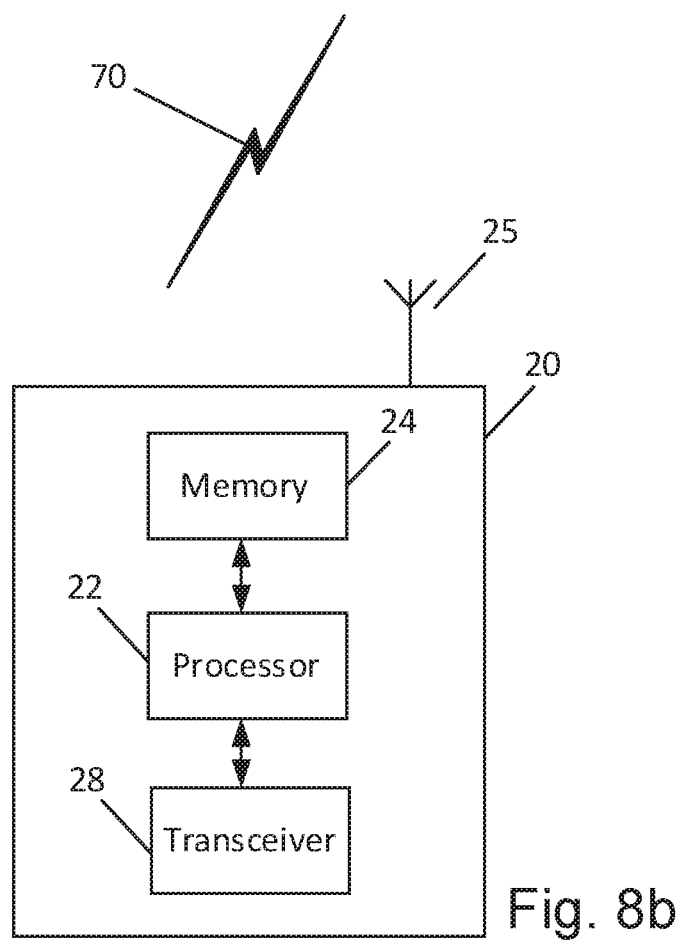
FIG. 8b illustrates an example block diagram of an apparatus, according to an embodiment.

FIG. 8b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8b.

As illustrated in the example of FIG. 8b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIGS. 5-7. For example, in certain embodiments, apparatus 20 may be configured to perform a procedure for handling limited or unavailable UL.

According to some embodiments, apparatus 20 may be controlled by memory 24 and processor 22 to detect that there is a problem with UL transmission on a cell. For example, the problem with UL transmission may include UL being completely unavailable or may include UL being restricted or limited, for example due to FCC MPE restrictions or some other reason. In some embodiments, the apparatus 20 may be configured by the network to report when there is a problem with UL transmission. In this case, apparatus 20 may be controlled by memory 24 and processor 22 to, when it detects there is a problem with UL, transmit an indication to the network that UL is limited or unavailable. For instance, in one example, apparatus 20 may be controlled by memory 24 and processor 22 to transmit capability information and/or other information element that may include a MPE field or limited UL information element field(s) used to indicate when there is a problem with UL transmission.

According to one embodiment, if the UL is still working but limited and apparatus 20 has SRB (e.g., SRB3) configured, apparatus 20 may be controlled by memory 24 and processor 22 to transmit an indication including a combined layer 2 UCI and RRC layer measurement result. The layer 2 UCI may be used to prevent the network from releasing the connection with a RLF procedure in case no more acknowledgements are sent by the apparatus 20. In certain embodiments, the measurement results may include neighboring cell measurement(s) including an indication about the strongest neighboring cells included with usability estimation. As such, in one example, apparatus 20 may be controlled by memory 24 and processor 22 to perform the usability estimation based on the antenna locations, directions and/or based on the UL buffer status. According to some embodiments, apparatus 20 may be controlled by memory 24 and processor 22 to transmit the indication to also include estimation about the DL quality and possibility for slow acknowledgement mode that aims to mainly use DL connection and very minimal UL. In one embodiment, if the UL cannot be used at all by the apparatus 20, then apparatus 20 may be controlled by memory 24 and processor 22 to transmit the indication, via LTE upper layer (e.g., RRC layer) or another 5G node, including a lower layer acknowledgement(s) and IE. In one example embodiment, apparatus 20 may be controlled by memory 24 and processor 22 to receive a HO command, from the network, to begin a HO procedure to a cell having better usability or availability.

Therefore, certain example embodiments provide several technical improvements, enhancements, and/or advantages. For example, certain embodiments provide methods for handling limited UL situations. According to example embodiments, for example, 5G systems can be improved so that they are able to continue to work with poor or non-existent UL connection. For instance, certain embodiments provide methods and apparatuses that allow for 5G to be used at higher frequencies while still complying with FCC MPE, as discussed in the foregoing.

As such, example embodiments may improve power efficiency, performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

A first embodiment may be directed to a method that may include configuring a UE to report when there is a problem with UL transmission on a cell and, when the UE detects a problem with the UL transmission, receiving, from the UE, an indication that the UL transmission is limited or unavailable. The method may also include, when acknowledgements are no longer being received from the UE, triggering an upper layer (e.g., RRC layer) to perform actions based on a measurement result previously received from the UE.

In a variant, the problem with the UL transmission may include the UL being completely unavailable or may include the UL being restricted or limited, for example due to FCC MPE restrictions or some other reason.

In a variant, the configuring of the UE may include receiving UE capability information or other information element, checking the UE capability information or other information element for a limited UL information element or MPE field that can be used to indicate if there is a problem with UL transmission, and, if the limited UL information element/MPE field is present, configuring the UE to report when there is a problem with UL transmission with certain defined information.

In a variant, if the UL is still working but limited and the UE has SRB (e.g., SRB3) configured, the receiving of the indication may include receiving an indication including a combined layer 2 UCI and RRC layer measurement result(s), wherein the layer 2 UCI may be used to prevent releasing the UE connection with a radio link failure (RLF) procedure in case no more acknowledgements are received from the UE.

In a variant, the measurement result(s) may include neighboring cell measurement(s) including an indication about the strongest neighboring cells included with a usability estimation, wherein the usability estimation is based on the antenna locations, directions and/or based on the UL buffer status.

In a further variant, the receiving of the indication may include receiving an indication including an estimation about the DL quality and possibility for slow acknowledgement mode that mainly uses DL connection and very minimal UL.

In another variant, if the UL cannot be used at all, then the receiving of the indication may include receiving the indication, via LTE upper (e.g., RRC) layer or another 5G node, including a lower layer acknowledgement(s) and information element (IE).

In a variant, the actions performed by the upper (e.g., RRC) layer may include requesting a lower layer (e.g., MAC layer) to start or activate reduced acknowledgement mode for the DL, or may include suspending the DL and beginning a handover (HO) procedure, for the UE, to a cell having better UL usability or availability.

In another variant, the activating of the reduced acknowledgement mode may include sending the acknowledgement and the IE to the lower layer (e.g., MAC layer), along with a new indication message or with a new information element.

In a further variant, in the reduced acknowledgement mode, the lower layer (e.g., MAC layer) is configured to schedule acknowledgement with a new K value that reduces acknowledgement via RRC. In a variant, in the reduced acknowledgement mode, the lower layer (e.g., MAC layer) repeats transmission of data as many times as defined and, if it does not receive DL acknowledgement of the data transmission from the UE, it continues with transmission of a next data packet.

A second embodiment may be directed to a method that may include detecting, by a UE, that there is a problem with UL transmission on a cell, and transmitting an indication to the network that the UL transmission is limited or unavailable. In one example, the transmitting may include transmitting UE capability information that may include a limited UL information element or MPE field(s) used to indicate when there is a problem with the UL transmission.

In a variant, if the UL is still working but limited and the UE has SRB (e.g., SRB3) configured, the transmitting may include transmitting an indication including a combined layer 2 UCI and RRC layer measurement result(s), wherein the layer 2 UCI may be used to prevent releasing the UE connection with a RLF procedure in the case where no more acknowledgements are sent by the UE.

In a variant, the UE measurement result(s) may include neighboring cell measurement(s) including an indication about the strongest neighboring cells included with a usability estimation.

In a further variant, the method may include performing the usability estimation based on the antenna locations, directions and/or based on the UL buffer status.

In another variant, the transmitting may include transmitting the indication to also include an estimation about the DL quality and possibility for slow acknowledgement mode that aims to mainly use DL connection and very minimal UL.

In a variant, if the UL cannot be used at all by the UE, then the transmitting may include transmitting the indication, via LTE upper layer (e.g., RRC layer) or another 5G node, including a lower layer acknowledgement(s) and information element (IE).

In a further variant, the method may include receiving a HO command, from the network, to begin a HO procedure to a cell having better usability or availability.

According to a third embodiment and a fourth embodiment, an apparatus can include at least one processor and at least one memory and computer program code. The at least one memory and the computer program code can be configured to, with the at least one processor, cause the apparatus at least to perform a method according to the first embodiment, the second embodiment, and any of their variants.

According to a fifth embodiment and a sixth embodiment, an apparatus can include means for performing the method according to the first embodiment, the second embodiment, any of their variants.

According to a seventh embodiment and an eighth embodiment, a computer program product may encode instructions for performing a process including a method according to the first embodiment, the second embodiment, and any of their variants.

According to a ninth embodiment and a tenth embodiment, a non-transitory computer-readable medium may encode instructions that, when executed in hardware, perform a process including a method according to the first embodiment, the second embodiment, and any of their variants.

According to a eleventh and a twelfth embodiment, a computer program code may include instructions for performing a method according to the first embodiment, the second embodiment, and any of their variants.

According to a thirteenth embodiment and a fourteenth, an apparatus may include circuitry configured to perform a process including a method according to the first embodiment, the second embodiment, and any of their variants.

We claim:

1. An apparatus, comprising:
   at least one processor; and
   at least one memory comprising computer program code,
   the at least one memory and computer program code configured, with the at least one processor, to cause the apparatus at least to:
   receive, from a user equipment, an indication that uplink transmission is limited or unavailable due to maximum permissible exposure requirement, wherein when receiving the indication, the at least one memory and computer program code configured, with the at least one processor, to cause the apparatus at least to receive a user equipment capability information or one or more other information elements from the user equipment,
      determine whether the user equipment is able to report when there is a problem with uplink transmission based on the user equipment capability information or one or more other information elements;
      when it is determined that the user equipment is able to report when there is a problem with
      uplink transmission, configure the user equipment to report when there is a problem with the uplink transmission; and
      when receiving the indication, receive a report from the user equipment indicating that there is a problem with the uplink transmission being unavailable or limited,
      wherein, when the uplink transmission is still working but limited, when receiving the report, the at least one memory and computer program code configured, with the at least one processor, to cause the apparatus at least to receive an indication including a combined layer 2 uplink control information, UCI, and radio resource control, RRC, layer measurement results, wherein the layer 2 UCI is used to prevent releasing the user equipment connection with a radio link failure procedure in case no more acknowledgements are received from the user equipment.

2. The apparatus according to claim 1, wherein the at least one memory and computer program code are further configured, with the at least one processor, to cause the apparatus at least to perform actions based on a measurement result previously received from the user equipment, wherein the measurement result comprises neighboring cell measurements including an indication about the strongest neighboring cells.

3. A method, comprising:
   transmitting an indication to a network that uplink transmission is limited or unavailable due to maximum permissible exposure requirement, wherein
   the transmitting of the indication comprises:
      transmitting to the network user equipment capability information or one or more other information elements;
      receiving a configuration to report when there is a problem with the uplink transmission;
      detecting that there is a problem with the uplink transmission; and
      wherein the transmitting the indication comprises transmitting a report to the network
      indicating that there is a problem with the uplink transmission being unavailable or limited,
      wherein, when the uplink transmission is still working but limited, the transmitting of the report comprises transmitting an indication including a combined layer 2 uplink control information and radio resource control layer measurement results.

4. The method according to claim 3, wherein the measurement results comprise neighboring cell measurements including an indication about the strongest neighboring cells.

5. The method according to claim 4, wherein the indication about the strongest neighboring cells further includes a usability estimation, and wherein the method further comprises performing the usability estimation based on at least one of antenna locations, directions or based on an uplink buffer status.

6. The method according to claim 3, wherein the transmitting of the report comprises transmitting an indication including at least one of an estimation about downlink quality and a possibility for a slow acknowledgement mode to use a downlink connection and the limited uplink connection.

7. The method according to claim 3, wherein, when the uplink cannot be used at all by the user equipment, the transmitting of the report comprises transmitting the report, via another network node.

8. The method according to claim 3, further comprising receiving from the network, a configuration to activate a reduced acknowledge mode for the downlink, or a handover command to begin a handover procedure to a cell having better usability or availability.

9. An apparatus, comprising:
at least one processor; and
at least one memory comprising computer program code,
the at least one memory and computer program code configured, with the at least one processor, to cause the apparatus at least to:
transmit an indication to a network that uplink transmission is limited or unavailable due to maximum permissible exposure requirement, wherein when transmitting the indication, the at least one memory and computer program code are further configured, with the at least one processor, to cause the apparatus at least to transmit to the network user equipment capability information or one or more other information elements,
receive a configuration to report when there is a problem with the uplink transmission;
detect that there is a problem with the uplink transmission; and
when transmitting the indication, transmit a report to the network indicating that there is a problem with the uplink transmission being unavailable or limited,
wherein, when the uplink transmission is still working but limited, when transmitting the report, the at least one memory and computer program code configured, with the at least one processor, to cause the apparatus at least to transmit an indication including a combined layer 2 uplink control information and radio resource control layer measurement results.

10. The apparatus according to claim 9, wherein the measurement results comprise neighboring cell measurements including an indication about the strongest neighboring cells.

11. The apparatus according to claim 9, wherein the indication about the strongest neighboring cells further includes a usability estimation, and wherein the at least one memory and computer program code are further configured, with the at least one processor, to cause the apparatus at least to:
perform the usability estimation based on at least one of antenna locations, directions or based on an uplink buffer status.

12. The apparatus according to claim 9, wherein when transmitting the report, the at least one memory and computer program code configured, with the at least one processor, to cause the apparatus at least to transmit an indication including at least one of an estimation about downlink quality and a possibility for a slow acknowledgement mode to use a downlink connection and the limited uplink connection.

13. The apparatus according to claim 9, wherein, when the uplink cannot be used at all by the apparatus, when transmitting the report, the at least one memory and computer program code configured, with the at least one processor, to cause the apparatus at least to transmit the report, via another network node.

14. The apparatus according to claim 9, wherein the at least one memory and computer program code are further configured, with the at least one processor, to cause the apparatus at least to:
receive from the network, a configuration to activate a reduced acknowledge mode for the downlink, or a handover command, to begin a handover procedure to a cell having better usability or availability.

* * * * *